Dec. 7, 1965  H. H. LE VEEN  3,221,741
CONTAINER FOR COLLECTING AND STORING BLOOD HAVING
ANTICOAGULANT MEANS THEREIN
Filed June 18, 1962

INVENTOR.
HARRY H. LE VEEN
BY
*Stowell & Stowell*
ATTORNEYS.

United States Patent Office 3,221,741
Patented Dec. 7, 1965

3,221,741
CONTAINER FOR COLLECTING AND STORING BLOOD HAVING ANTICOAGULANT MEANS THEREIN
Harry H. Le Veen, 85—35 Midland Parkway, Jamaica, N.Y.
Filed June 18, 1962, Ser. No. 203,112
1 Claim. (Cl. 128—272)

This invention relates to improvements in containers for collecting and storing blood.

In the collection of whole blood, it is common practice to reduce coagulation of the blood by collecting the whole blood in sterile containers containing a pyrogen-free anticoagulant such as an aqueous solution of citric acid, sodium citrate and dextrose, known as A.C.D. solution. Due to the high osmolarity of the concentrated A.C.D. solution, during the initial period of collection of the whole blood, the red blood cells in the collected blood are often damaged. Cell trauma during the collection of the first 50 to 75 cc. of blood has been found to be so extensive that the life span of the first 50 to 75 cc. of collected blood is generally considered to be less than about 48 hours in the recipient.

After the collection of 50 to 75 cc. of blood, the A.C.D. solution in the collection container is diluted by the blood to an extent that trauma of the cells no longer presents a particular problem.

It is, therefore, a particular object of the present invention to provide a device for collecting and storing blood that restricts or retards the mixing of the first drawn blood with the anticoagulant solution to thereby reduce cell damage in the blood.

It is an object to provide such a device wherein mixing of the blood and the anticoagulant is restricted by a mechanical barrier maintained between the blood entering the collection container and the anticoagulant solution whereby the blood and the anticoagulant solution are slowly dispersed.

It is a further object of the present invention to provide such a device that may be sterilized, using conventional sterilization procedures and which will not materially increase the cost of the collection device or interfere with substantially normal collection procedures.

These and other objects and advantages are provided in apparatus for collecting and storing blood comprising a container having a blood inlet and blood outlet opening, and means providing a storage zone for an anticoagulant solution within the container, the storage zone permitting restricted fluid flow between blood entering the container through the blood inlet and the anticoagulant solution maintained in the storage zone.

Figure 1:
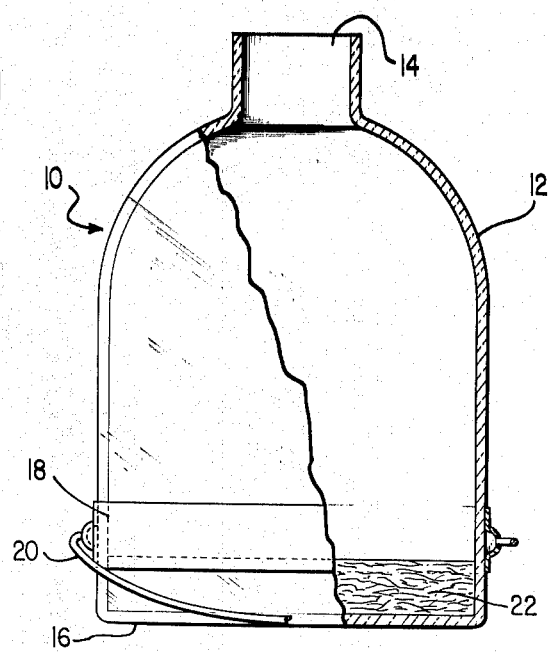
Figure 2:
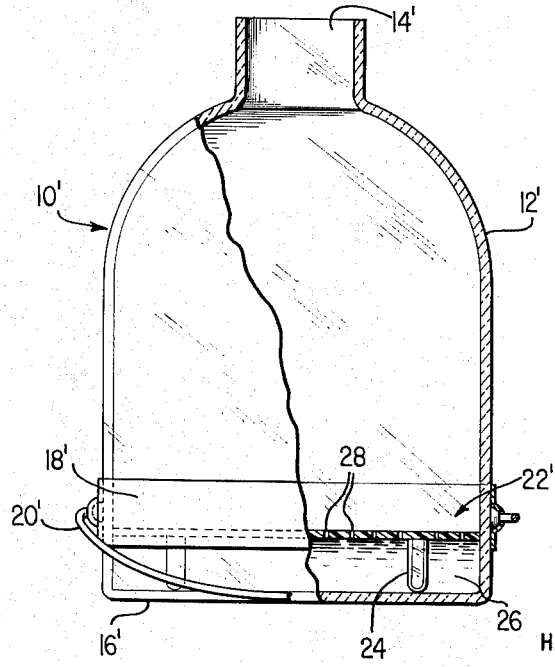

The invention will be more particularly described with reference to the illustrated embodiments of the invention shown in the accompanying drawings wherein:

FIG. 1 is a fragmentary elevational view in partial section of a blood collecting and storing apparatus constructed in accordance with the teachings of the present invention; and FIG. 2 is a fragmentary elevational view similar to that shown in FIG. 1 of a modified form of the improved apparatus for collecting and storing blood.

Referring particularly to FIG. 1 of the drawings, 10 generally designates the improved blood collection device which includes a container 12 having a blood inlet and outlet opening 14 at its upper end and, preferably, a flat base portion 16. The illustrated container is fitted with a band 18 which pivotally mounts a conventional bail 20 whereby the container 10 may be suspended from the bail 20 with the blood inlet 14 facing downwardly so that the contents of the container may be discharged by gravity in the conventional manner.

Within the container, there is provided a physical barrier member generally designated 22. In this form of the present invention, the barrier member 22 comprises a liquid permeable, porous or absorbent material adapted to contain the entire liquid volume of the anticoagulant solution to be mixed with the blood to be added to the container. The barrier member 22 preferably comprises a glass fiber mat coated with a conventional glass siliconizing agent. The siliconized glass mat is relatively inexpensive whereby a new barrier may be inserted in the container on each re-use of the container or the mat may be sterilized with the container using conventional steam and gaseous sterilization procedures. The mat may comprise a porous glass structure, synthetic or natural sponge elements constructed of materials insoluble in the blood and the selected anticoagulant solution, and woven or non-woven fiber mats composed of natural or synthetic fibers and the like.

The assembly of bottle, mat and conventional blood tube, not shown, is sterilized and, for example, 75 cc. of an A.C.D. solution for each 500 cc. blood capacity of the container 12, is placed in the container. During transfer of blood to the container, the blood entering the container is only slowly mixed with the A.C.D. solution absorbed in the mat 22 thereby reducing blood cell damage during the early stage of blood collection.

A typical A.C.D. solution may comprise: trisodium citrate, 22 grams; citric acid, 8 grams; dextrose, 24.5 grams; and water to make 1000 cc.

Another form of the blood collecting and storage container of the invention is illustrated in FIG. 2 wherein the device 10' comprises a vessel 12' having an inlet and outlet neck portion 14', a base 16' and band and bail 18' and 20'. The mechanical barrier 22' in this form of the invention comprises a perforated plate. The perforated plate 22' is supported adjacent the base 16' of the container 12' by a plurality of depending support elements 24. In the illustrated form of the invention, the depending support elements 24 comprise hollow glass elements of sealed construction with each displacing a volume such that the total number of depending elements 24 will float the perforated plate member 22' on the anticoagulant solution 26 to be inserted in the container. The number and size of the openings 28 in the partition 22' are selected to permit intermixing of blood entering the container with the A.C.D. solution below the barrier at a relatively slow uniform rate. Openings in the order of about 2 millimeters in diameter and relatively uniformly spaced over the surface of the barrier will satisfactorily provide the intended function.

The barrier plate 22' is preferably constructed of a flexible or resilient material whereby the barrier may be readily inserted and removed from the container. Barrier plates constructed of polypropylene which may be heat-autoclaved have been found to be very suitable while a number of the olefinic type plastics also have physical properties which render them ideally suitable for use in the present invention. The barrier may also comprise a liquid porous glass plate constructed by conventional porous glass methods or a photoetchable glass plate may be utilized with the openings formed therein by known photoetching procedures.

Use of the device shown in FIG. 2 is similar to that described with reference to FIG. 1 in that a sterile solution of anticoagulant is placed in a sterilized container of the invention below the partition member 22'. Since the partition member is liquid permeable, the liquid anticoagulant may be placed in the container after the partition member has been positioned therein.

From the foregoing description of the present invention, it will be seen that the improvement in containers for collecting and storing blood fully accomplish the aims and objects hereinbefore set forth.

I claim:

A parenteral apparatus for collecting and storing blood, comprising a container having side walls, a bottom and an opening at its top, a blood anti-coagulant in said container, means within said container for diminishing blood cell trauma upon initial contact of blood with said anti-coagulant, said means retarding the mixing of blood initially put into said container with the entire mass of said anti-coagulant, said means comprising an absorbent pad insoluble in blood, said pad covering substantially the entire bottom surface of said container and being of substantial thickness, said pad being saturated with anti-coagulant, the anti-coagulant being dispersed throughout substantially all of the interstices of said absorbent pad.

References Cited by the Examiner
UNITED STATES PATENTS

| | | | |
|---|---|---|---|
| 2,258,030 | 10/1941 | Oxley | 206—.5 X |
| 2,664,854 | 1/1954 | Talbot | 215—6 X |
| 2,812,231 | 11/1957 | Zar | 128—272 |

RICHARD A. GAUDET, *Primary Examiner.*